(12) United States Patent
Kumar et al.

(10) Patent No.: US 9,885,774 B2
(45) Date of Patent: Feb. 6, 2018

(54) INDOOR LOCALIZATION OF A MULTI-ANTENNA RECEIVER

(71) Applicant: Massachusetts Institute of Technology, Cambridge, MA (US)

(72) Inventors: Swarun Suresh Kumar, Cambridge, MA (US); Stephanie Gil, Pomona, NY (US); Dina Katabi, Cambridge, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 460 days.

(21) Appl. No.: 14/689,474

(22) Filed: Apr. 17, 2015

(65) Prior Publication Data

US 2017/0299691 A1 Oct. 19, 2017

Related U.S. Application Data

(60) Provisional application No. 61/981,264, filed on Apr. 18, 2014.

(51) Int. Cl.
*G01S 5/08* (2006.01)
*G01S 5/10* (2006.01)
*G01S 5/02* (2010.01)

(52) U.S. Cl.
CPC .............. *G01S 5/10* (2013.01); *G01S 5/0247* (2013.01); *G01S 5/0263* (2013.01); *G01S 5/08* (2013.01)

(58) Field of Classification Search
CPC ............. G01S 5/0247; G01S 5/08; G01S 5/10
See application file for complete search history.

(56) References Cited

U.S. PATENT DOCUMENTS 5,589,838 A  12/1996  McEwan
6,148,195 A  11/2000  Schuchman et al.
(Continued)

FOREIGN PATENT DOCUMENTS

FR     2280088      2/1976
WO  2013071302      5/2013
(Continued)

OTHER PUBLICATIONS

Amendolare, Vincent et al., "Transactional Array Reconciliation Tomography for Precision Indoor Location." IEEE Transactions on Aerospace and Electronic Systems vol. 50, No. 1, Jan. 2014.
(Continued)

*Primary Examiner* — Gregory C. Issing
(74) *Attorney, Agent, or Firm* — Occhiuti & Rohlicek LLP

(57) ABSTRACT

An approach to localization in an indoor environment makes use of a multiple antenna receiver (e.g., in a smartphone, tablet, camera) and knowledge of locations of one or more radio transmitters, which may be part of a data communication infrastructure providing data communication services to devices in the environment. Successive measurements of transmissions from the transmitters are recorded at the receiver as the device is translated and rotated in the environment. Rotation related measurements are also made at the device. The radio frequency and rotation related measurements are used to infer the location and orientation, together referred to as the pose, of the device. Phase synchronization of the transmitters and the receiver are not required. In general, accuracy of the pose estimate far exceeds that achievable using radio frequency measurements without taking into consideration motion of the device, and far exceeds that achievable using the inertial measurements alone.

20 Claims, 4 Drawing Sheets

(56) References Cited

U.S. PATENT DOCUMENTS

| | | | |
|---|---|---|---|
| 6,784,827 B2 | 8/2004 | Hirt | |
| 7,009,561 B2 | 3/2006 | Menache et al. | |
| 7,292,189 B2 | 11/2007 | Orr et al. | |
| 7,515,916 B1 | 4/2009 | Alexander | |
| 8,031,121 B2 * | 10/2011 | Rofougaran | G01S 7/412 342/458 |
| 8,077,091 B1 | 12/2011 | Guigne et al. | |
| 8,588,808 B2 | 11/2013 | Levin et al. | |
| 8,599,758 B1 | 12/2013 | Ogale et al. | |
| 9,288,623 B2 | 3/2016 | Markhovsky et al. | |
| 9,699,607 B2 | 7/2017 | Markhovsky et al. | |
| 2002/0160840 A1 * | 10/2002 | Morkris | A63F 9/0291 463/49 |
| 2008/0122681 A1 | 5/2008 | Shirakawa | |
| 2012/0320787 A1 | 12/2012 | Sugar et al. | |
| 2013/0023285 A1 | 1/2013 | Markhovsky et al. | |
| 2013/0039391 A1 | 2/2013 | Skarp | |
| 2013/0169626 A1 | 7/2013 | Balan et al. | |
| 2013/0177098 A1 | 7/2013 | Jung et al. | |
| 2013/0225208 A1 | 8/2013 | Lu et al. | |
| 2013/0226451 A1 | 8/2013 | O'Neill et al. | |
| 2013/0293416 A1 | 11/2013 | Waters et al. | |
| 2014/0073345 A1 | 3/2014 | Chintalapudi et al. | |
| 2014/0073363 A1 | 3/2014 | Tidd et al. | |
| 2014/0094200 A1 | 4/2014 | Schatzberg et al. | |
| 2014/0171107 A1 | 6/2014 | Kao et al. | |
| 2015/0192656 A1 * | 7/2015 | Werner | G01S 3/46 342/352 |
| 2015/0234033 A1 | 8/2015 | Jamieson et al. | |
| 2017/0199269 A1 * | 7/2017 | Allen | G01S 5/10 |

FOREIGN PATENT DOCUMENTS

| | | |
|---|---|---|
| WO | 2013160286 | 10/2013 |
| WO | 2014074837 | 5/2014 |

OTHER PUBLICATIONS

Bocquet, Michael et al., "Using Enhanced-TDOA Measurement for Indoor Positioning," IEEE Microwave and Wireless Components Letters, vol. 15, No. 10, Oct. 2005, pp. 612-614.

Cavanaugh, Andrew F., "Inverse Synthetic Array Reconciliation Tomography." A Dissertation Submitted to the Faculty of Worcester Polytechnic Institute, (2013).

Kothari, Nisarg et al., "Robust Indoor Localization on a Commercial Smart-Phone," Carnegie-Mellon University, Aug. 2011.

* cited by examiner

INDOOR LOCALIZATION OF A MULTI-ANTENNA RECEIVER

CROSS-REFERENCE TO RELATED APPLICATIONS

This application claims the benefit of U.S. Provisional Application No. 61/981,264, titled "ACCURATE INDOOR LOCALIZATION WITH ZERO START-UP COST," filed Apr. 18, 2014, the contents of which are incorporated herein by reference.

STATEMENT AS TO FEDERALLY SPONSORED RESEARCH

This invention was made with Government support under Contract No. FA8721-05-C-0002 awarded by the U.S. Air Force and under Contract No. W911NF-08-2-0004 awarded by the U.S. Army. The Government has certain rights in the invention.

BACKGROUND

This invention relates to indoor localization of a multi-antenna receiver.

Recent years have seen the advent of new radio frequency (RF) localization systems that demonstrate tens of centimeters of accuracy. However, many such systems require either deployment of new infrastructure, or extensive fingerprinting of the environment through training or crowd sourcing, impeding their wide-scale adoption.

There is a need for accurate indoor localization that can use existing infrastructure without extensive characterization of indoor environments.

SUMMARY

In one general aspect, an approach to localization in an indoor environment makes use of a multiple antenna receiver, for example, integrated into a portable device such as a smartphone, tablet, camera, etc. and knowledge of locations of one or more radio transmitters. Typically, these transmitters are part of a data communication infrastructure providing data communication services to the portable device or other devices in the environment. Successive measurements of transmissions from the transmitters are recorded at the receiver as the device is translated and/or rotated in the environment. Rotation related measurements (e.g., rotational acceleration measurements, camera optical flow measurements, etc) are also made at the device. The radio frequency and rotation related measurements are used to infer the location and orientation, together referred to as the pose, of the device. Phase synchronization of the transmitters and the receiver are not required. In general, accuracy of the pose estimate far exceeds that achievable using radio frequency measurements without taking into consideration motion of the device, and far exceeds that achievable using the inertial measurements alone.

An advantage of the approach is that the motion (translation and rotation) of the device as it is acquiring the measurements does not have to be constrained. For example, the user does not have to rotate the device in pattern (e.g., in a circle).

At least some embodiments make use of the localization of the device to combine images acquired from the device (i.e., using a camera) to further localize objects in the environment. For example, stereo photography techniques are used to combine the images to locate the objects seen in the images relative to the locations of the camera at the time the images were taken.

In another aspect, in general, a method for localization of a device makes use of a plurality of transmissions received at the device. Each transmission is emitted from a corresponding transmitter of a plurality of transmitters at fixed locations in an environment. Each of the plurality of transmissions is received at a plurality of antennas at fixed locations on the device. Each transmission is received at a different time. The device is at a different poses at at least some of the times. For each transmission one or more relative channel characteristics between the corresponding transmitter and the plurality of antennas are characterized. The relative channel characteristics are then processed to form a direction profile. An orientation of the device at the time of receiving the transmission is also measured. For each transmitter, the direction profiles and measured orientations for transmission corresponding to the transmitter are combined to form a combined direction profile. Pose-related data is then determined for the device from the combined direction profiles for multiple of the transmitters and from locations of the transmitters, the pose-related data including at least a location of the device.

Aspect may include one or more of the following features.

Characterizing the one or more relative channels includes, for one or more pairs of antennas, determining a channel characteristic for the transmission from the corresponding transmitter to each antenna of the pair of antennas, and combining the channel characteristics for the pair of antennas.

Each channel characteristic characterizes at least a phase of the channel, and may further characterize a gain of the channel.

Characterizing a relative channel includes, for one or more pairs of antennas, computing a product of a first complex channel characterization to a first antenna of the pair of antennas and a complex conjugate of a second complex channel characterization to a second antenna of the pair or antennas.

Processing the relative channel characteristics to form the direction profile comprises computing a function of a direction of arrival from the one or more relative channel characteristics.

Measuring the orientation of the device includes acquiring an inertial measurement characterizing at least one of an orientation and a change in orientation of the device.

The inertial measurement comprises a gyroscope measurement.

Combining the direction profiles and the measured orientations comprises estimating a drift in the measured orientations, and mitigating an effect of said drift in the determining the pose-related data.

Determining the pose-related data for the device comprises estimating one or more angles of arrival for each transmitter, and triangulating the device using said estimated angles.

At least some of the transmissions follow multiple paths to the antennas of the device and at least one transmitter has multiple estimated angles of arrival. The combined direction profiles comprises selecting one of the estimated angles of arrival as the direct angle of arrival for said transmitter.

A user of the device is instructed to move the device in the environment, and receiving the plurality of transmissions during resulting motion of the device. For example, the user is instructed to rotate the device.

Optical images of one or more objects in the environment at acquired at a plurality of image acquisition times. For example, the image acquisition times are a subset of the transmission times.

The optical images are combined to determine poses-related data for the device relative to the one or more objects at the image acquisition times.

The pose-related data determined from the direction profiles and the pose-related data determined from the optical images are combined. In some examples, this combination improves accuracy and/or reduces ambiguity of the determined poses (e.g, when the antenna configuration cannot resolve an angle of rotation about a line joining the antennas which can be resolved using the images).

Combining the optical images includes determining a three-dimensional representation of the one or more objects, and combining the pose-related data includes determining a location of the three-dimensional representation relative to locations of the plurality of transmitters.

In another aspect, in general, software stored on a non-transitory machine-readable medium comprises instructions for causing a processor (or more than one processor) to perform all the steps of any of the methods set forth above. The one or more processors may be hosted in a portable device and/or in a fixed device, for instance, at a central server computer or embedded in an access point.

In at least one example, the instructions cause the processor to receive a plurality of transmissions, each transmission being emitted from a corresponding transmitter of a plurality of transmitters at fixed locations in an environment, the receiving including receiving each of the plurality of transmissions at a plurality of antennas at fixed locations on the device, each transmission being received at a different time of a plurality of transmission times, the being a different poses of a plurality of poses at at least some of the times of the plurality of transmission times; for each transmission of the plurality of transmissions, characterize one or more relative channel characteristics between the corresponding transmitter and the plurality of antennas, process the relative channel characteristics to form a direction profile, measure an orientation of the device at the time of receiving the transmission; for each transmitter of the plurality of transmitters, combine the direction profiles and measured orientations for transmission of the plurality of transmissions corresponding to the transmitter to form a combined direction profile; and determine pose-related data for the device from the combined direction profiles for multiple of the transmitters and from locations of the transmitters, the pose-related data including at least a location of the device.

In another aspect, in general, a localizable device is configured to perform all the steps of any of the methods set forth above.

In another aspect, in general, a localizable device includes a plurality of antennas for receiving transmissions from corresponding transmitters at fixed locations in an environment. A receiver is coupled to the antennas. The receiver is configured to provide channel characterizations for channels from the transmitters via the antennas. The device also includes an orientation sensor, and a storage for data characterizing locations of the transmitters. The orientation sensor is for providing orientation-related measurements (e.g., absolute orientation, or first or second derivatives or orientation). A localizer is coupled to the receiver, the storage, and the orientation sensor, and is configured to compute pose-related data for the device by: for each transmission of the plurality of transmissions, characterizing one or more relative channel characteristics between the corresponding transmitter and the plurality of antennas, processing the relative channel characteristics to form a direction profile, measuring an orientation of the device at the time of receiving the transmission; for each transmitter of the plurality of transmitters, combining the direction profiles and measured orientations for transmission of the plurality of transmissions corresponding to the transmitter to form a combined direction profile; and determining pose-related data for the device from the combined direction profiles for multiple of the transmitters and from locations of the transmitters, the pose-related data including at least a location of the device.

In some examples, the localizable device includes a camera and a storage for images acquired by the camera. The device also includes an image processor configured to combine the images by determining poses-related data for the device relative to one or more objects in said images. The localizer is further configured to combine the pose-related data determined from the transmissions and the pose-related data determined by the image processor.

In another aspect, in general, a localization system includes a localizable device that includes a plurality of antennas for receiving transmissions from corresponding transmitters at fixed locations in an environment. A receiver is coupled to the antennas. The receiver is configured to provide channel characterizations for channels from the transmitters via the antennas. The device also includes an orientation sensor. A localizer as described above and/or an image processor as described above is not necessarily hosted in the localizable device. Rather, the localizer is configured to receive information from the receiver and the orientation sensor, for example, using wireless radio communication. The localizer and/or image processor may be hosted in a fixed device, such as in a server computer or in an access point that is in communication with the localizable device.

Other features and advantages of the invention are apparent from the following description, and from the claims.

DESCRIPTION

Figure 1:
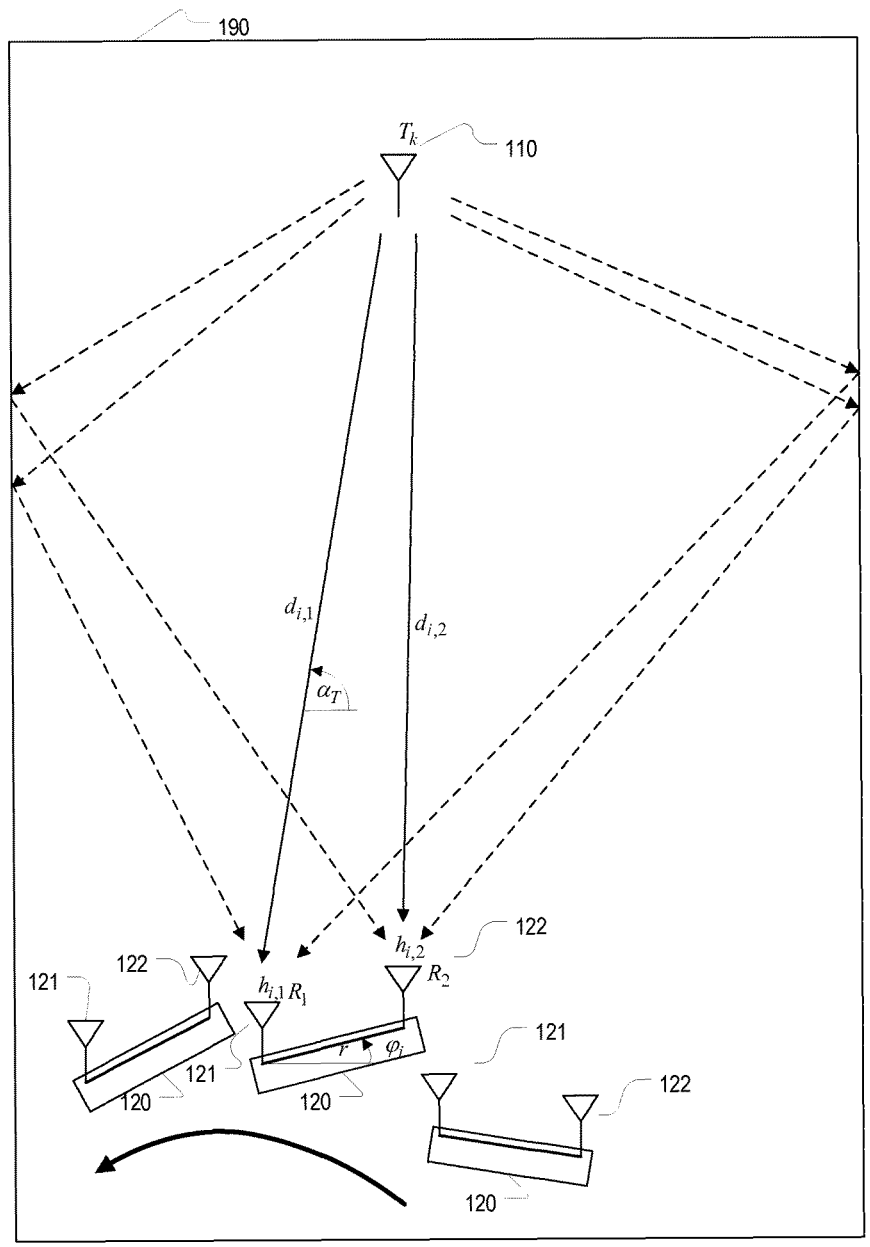
FIG. 1 is a schematic diagram showing a multiple antenna device in multiple locations receiving transmissions from a single transmitter.

Referring to FIG. 1, a device 120 to be localized in an indoor environment 190 (e.g. in a room) has multiple antennas. In FIG. 1, two antennas, R1 121 and R2 122 are shown, although it should be understood that the techniques described in this document can use more than two antennas on the device. The relative locations of the antennas 121, 122 on the device 120 are fixed, for example, in the case of two antennas that are separated by a fixed distance r. The device 120 is free to move in the environment 190. As the device moves in the environment, it receives transmissions from transmitters 110 at known locations in the environment. In FIG. 1, a single transmitter T 110 is shown, but again it should be recognized that a typical environment will have multiple transmitters with the device 120 in their transmission ranges. The device 120 is illustrated in FIG. 1 in three successive locations at which it receives transmissions.

At a representative location (i.e., the center location illustrated), a transmission from the transmitter T 120 is received at the two antennas R1 121 and R2 122 of the device 120. In general, the received signals received at the antennas are a combination of signals received over direct transmission paths, indicated as solid lines to antennas R1 and R2, respectively, as well as signals that are received via reflected paths, which are indicated as dashed lines in the figure. The discussion below first focuses on the direct transmission path. The initial discussion below also first focuses on a two-dimensional scenario in which all the antennas and transmission paths are in a two-dimensional plane. However, it should be understood, and as is described more fully below, in general the approach is applied to three dimensions, and to situations in which the device has more than two antennas.

In the two-dimensional illustration of FIG. 1, at the $i^{th}$ transmission, the device is at a location $(x_i, y_i)$ and an orientation $\varphi_i$ relative to the frame of reference of the environment. For sake of illustration, and in at least some of the embodiments, the transmitter T 110 is assumed to be in a fixed direction $\alpha_T$ relative to the device 120. That is, under this assumption, this angle does not change with the motion of the device, essentially assuming that the distance to the transmitter is substantially larger than the separation of the antennas or the spatial extent of the motion of the device as it collects transmissions from the transmitter.

Very generally, at the $i^{th}$ location, the device obtains channel estimates $h_{i,1}$ and $h_{i,2}$ (i.e., complex quantities representing magnitude and phase of the channels) for the radio paths from the transmitter to each of its antenna (i.e., in general including direct as well as reflected paths). The successive sets of channel estimates, as well as orientation estimates $\hat{\varphi}_i$, are then used to estimate a direction to the transmitter. This process is performed for multiple transmitters, which are at multiple different known locations, and the estimated angles to each of the multiple transmitters are used along with the known locations of the transmitters to estimate a location and orientation of the device.

Figure 2:
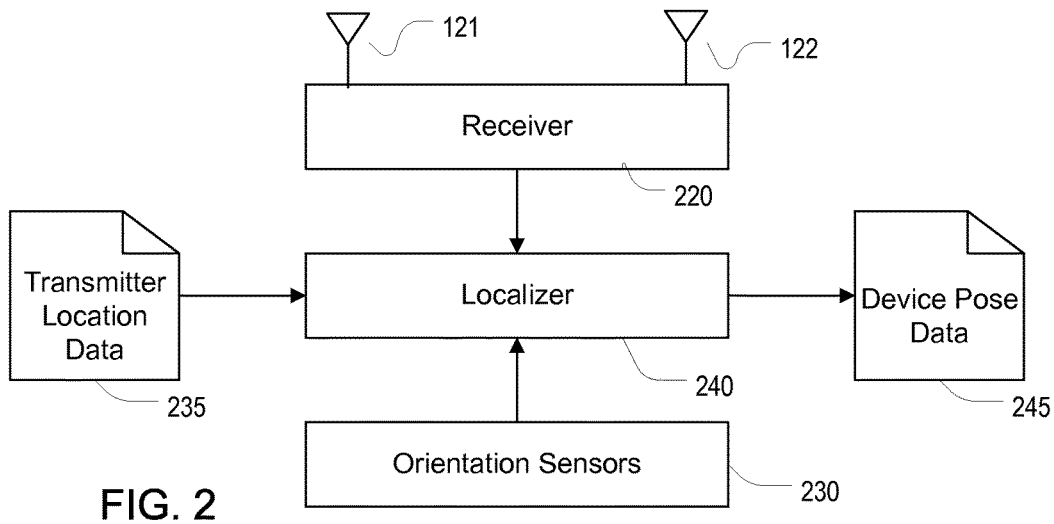
FIG. 2 is a block diagram of a device.

Referring to FIG. 2, the device 120 includes a receiver 220, which receives the signals resulting from the transmissions via the antennas 121, 122, and computes and passes the channel estimates to a localizer 240. The localizer 240 uses transmitter location data 235 (e.g., the locations of the transmitters) stored at the device (or otherwise accessible to the device) as well as orientation sensor measurements from an orientation sensor 230 to determine the device pose data 245. In at least some embodiments, the orientation sensors 230 include rotational accelerometers or gyroscopes and the sensor measurements include orientation measurements, for instance, formed by integrating rotational acceleration signals. As discussed below, such orientation measurements typically include substantial drift, which is accounted for by at least some embodiments as described below. The localizer 240 as well as other modules of the device and signal paths coupling the modules are implemented in at least some embodiments in software, and the device includes a processor and storage for instructions (not shown) to implement the modules.

Figure 3:
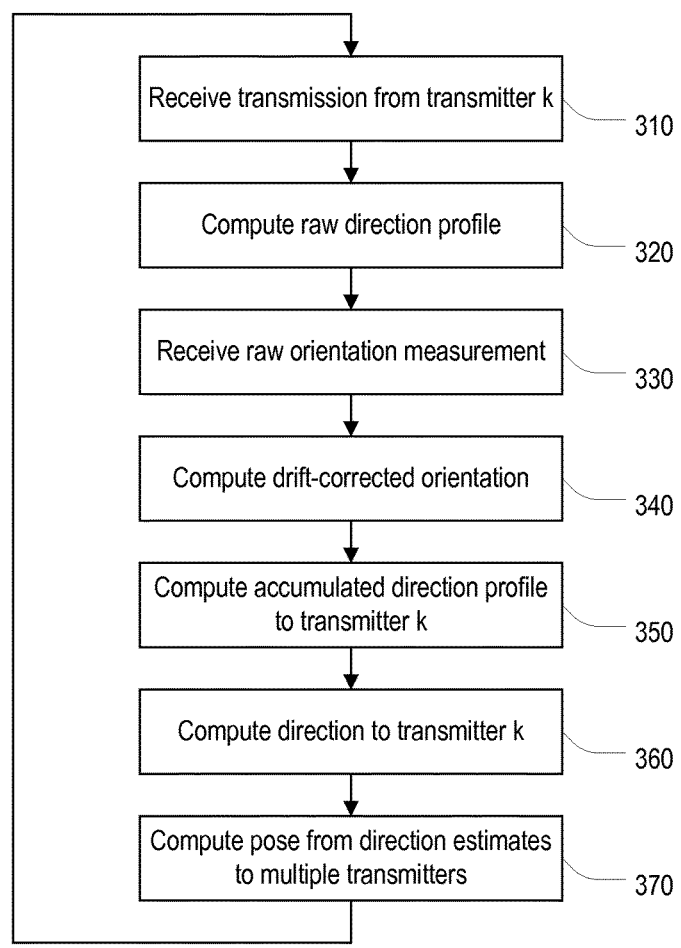
FIG. 3 is a flowchart of a procedure implemented in a device.

Referring to FIG. 3, the process outlined above can be summarized as follows. The device repeats a set of steps 310-370 to repeatedly update an estimate of the pose of the device. In this example, the device receives a transmission from transmitter $T_k$ (step 310). The device computes a raw orientation profile $P(\alpha)$ from the transmission, which in general is a complex function of an orientation where $\alpha \in [0, 2\pi]$ (step 320). Details regarding computation of $P(\alpha)$ are provided below. The localizer receives a raw orientation estimate $\hat{\varphi}$ from the orientation sensor (step 330), from which it computes a drift corrected orientation $\varphi$ (step 340). It then accumulates the orientation profile $P(\alpha)$ (adjusted according to the orientation) with prior orientation profiles to the transmitter (step 350) and computes a direction estimate $\alpha_{T_k}$ for the transmitter (step 360). The localizer then uses multiple of the direction estimates and the locations of the corresponding transmitters to compute the pose of the device (step 370). This process is repeated for each received transmission.

Figure 4:
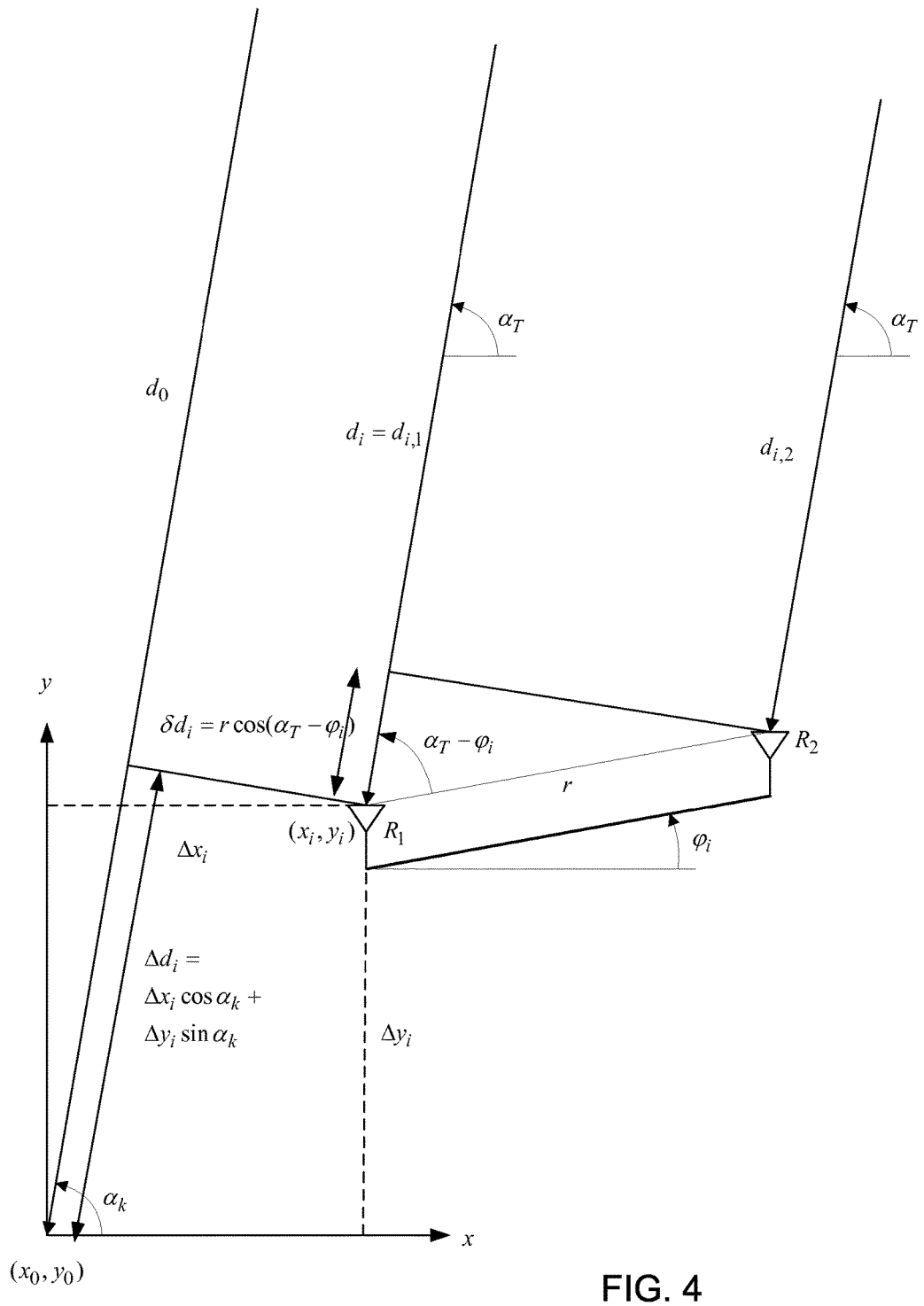
FIG. 4 is a schematic diagram showing signal paths from a transmitter to a device.

Referring to FIG. 4, a situation in which the device is at a position $(x_i, y_i)$ with an orientation $\varphi_i$ is illustrated for a direction of arrival of $\alpha_T$ to the transmitter (the direction $\alpha_T$ and orientation $\varphi_i$ are measured relative to the x axis; in the figure $\alpha_T \approx 80°$ and $\varphi_i \approx 30°$. Initially, a situation in which only a direct transmission path from direction $\alpha_T$ from the transmitter to the device is present is discussed, and this is followed with a discussion of a multipath situation in which in addition to the direct path, a number of reflected paths also link the transmitter and the antennas of the device.

When the device receives the transmission at its antennas from the transmitter, it uses conventional techniques to estimate complex channels $h_{i,1}$ and $h_{i,2}$ from the transmitter to its antennas. For example, such channel estimation is used in Multi-Input Multi-Output (MIMO) wireless interfaces today and is readily accessible to software executing in the device. Rather than considering the absolute channels, a relative channel is computed as $\hat{h}_i = h_{i,2} h^*_{i,1}$, where ( )* denotes the complex conjugate (i.e., negation of the imaginary part).

The relative channel $\hat{h}_i$ is insensitive to an absolute phase difference between the transmitter and the receiver. This is evident because a change if a phase $\psi$ were added at the transmitter, then $h_{i,1}$ and $h_{i,2}$ would both be multiplied by $\exp(j\psi)$ and the product $\hat{h}_i = h_{i,2} h^*_{i,1}$ remains unchanged.

In the case of a single direct path from the transmitter to the device, the relative channel is also insensitive to the $(x_i, y_i)$ location of the device given a fixed $\varphi_i$. This insensitivity can be understood by considering a deviation $(\Delta x_i, \Delta y_i)$ from a reference $(x_0, y_0)$ location. For such a change, the transmission path from the transmitter to each of the antennas changes by $\Delta d_i = \Delta x_i \cos \alpha_T + \Delta y_i \sin \alpha_T$, and therefore the phase of the channel to each receiver is multiplied by $\exp(-jk\Delta d_i)$, where $k = 2\pi/\lambda$, where $\lambda$ is the wavelength of the radio signal, and therefore the product $\hat{h}_i = h_{i,2} h^*_{i,1}$ remains unchanged. Because the product remains unchanged for any increment $(\Delta x_i, \Delta y_i)$, the product is necessarily insensitive to any $(x_i, y_i)$ location of the device given a fixed $\varphi_i$.

The phase of the product $\hat{h}_i = h_{i,2} h^*_{i,1}$ can be determined in the illustration in which there is only one path from the transmitter to the device by considering the difference $\delta d_i$ in path lengths to each of the antennas, such that the distance from the transmitter to the first antenna is $d_i = d_{i,1}$ and the distance to the second antenna is $d_i - \delta d_i$. As shown in FIG. 4, this difference satisfies $\delta d_i = r \cos(\alpha_T - \varphi_i)$. Therefore the channels can be approximated as $$h_{i,1} = \left(\frac{1}{d_i}\right) \exp(-jkd_i), \text{ and}$$

-continued $$h_{i,1} = \left(\frac{1}{d_i - \delta d_i}\right)\exp(-jk(d_i - \delta d_i)) = \left(\frac{1}{d_i - \delta d_i}\right)\exp(-jk(d_i - r\cos(\alpha_t - \varphi_i))).$$

Assuming that $\delta d_i$ is small relative to $d_i$, the product $h_{2,i}h^*_{i,1}$ can be approximated as $$\hat{h}_i = h_{i,2}h^*_{i,1} \approx (1/d_i^2)\exp(-jkr\cos(\alpha_T - \varphi_i)) = (1/d_i^2)\exp(-jk\delta d_i).$$

For this transmission, assuming that the angle $\varphi_i$ is known, the localizer computes a direction profile as $$P_i(\alpha) = \hat{h}_j \exp(+jkr\cos(\alpha - \varphi_i)).$$

For a sequence of transmissions from the same transmitter, the localizer computes $$P(\alpha) = (1/n)|\Sigma_{i=1}^n P_i(\alpha)|^2,$$

which in general has a peak at $\alpha = \alpha_T$.

In the description above, only a single path from the transmitter to the device is considered. More generally, each transmission of a series of transmissions (indexed i=1, 2, ... N) arrives at the antennas at a set of m=1, 2, ..., M distinct angles $\alpha_1, \ldots, \alpha_M$. Assuming that there is a direct path, one of these angles $\alpha_1, \ldots, \alpha_M$ corresponds to the direct path, without loss of generality with $\alpha_1 = \alpha_T$, and that the effective path lengths from the transmitter arriving at each of the angles at the first antenna at the first location (i=1) are $d_1, \ldots, d_M$, respectively. Quantities associated with an arrival direction from the $k^{th}$ direction are generally denoted using the first subscript for that direction. The distance from the transmitter to the first antenna for the $i^{th}$ from the $m^{th}$ direction transmission is therefore $$d_{m,i} = d_{m,i,1} = d_{m,0} - \Delta d_{m,i}$$
$$= d_{m,0} - \Delta x_i \cos\alpha_m - \Delta y_i \sin\alpha_m$$

where locations of the first antenna at each of the transmissions are $$(x_i, y_i) = (x_0, y_0) + (\Delta x_i, \Delta y_i)$$

from a reference location $(x_0, y_0)$. The distance to the second antenna is $$d_{m,i,2} = d_{m,i,1} - \delta d_{m,i} = d_{m,0} - \Delta d_{m,i} - \delta d_{m,i}$$
$$= d_{m,i,1} - r\cos(\alpha_m - \varphi_i)$$
$$= d_{m,0} - \Delta x_i \cos\alpha_m - \Delta y_i \sin\alpha_m - r\cos(\alpha_m - \varphi_i)$$

If the attenuation and phase shift on the path arriving at angle $\alpha_m$ is represented as $s_m$, then the combination of the signal paths over the M directions has the form $$h_{i,1} = \sum_{m=1}^M \left(\frac{s_m}{d_{m,i}}\right)\exp(-jkd_{m,i})$$
$$= \sum_{m=1}^M \left(\frac{s_m}{d_{m,i}}\right)\exp(-jk(d_{m,0} - \Delta d_{m,i}))$$
$$= \sum_{m=1}^M \left(\frac{s_m}{d_{m,i}}\right)\exp(-jk(d_{m,0} - \Delta x_i \cos\alpha_m - \Delta y_i \sin\alpha_m))$$

and $$h_{i,2} = \sum_{l=1}^M \left(\frac{s_l}{d_{l,i}}\right)\exp(-jkd_{l,i,2})$$
$$= \sum_{l=1}^M \left(\frac{s_l}{d_{l,i}}\right)\exp(-jk(d_{l,0} - \Delta dl, i - \delta d_{l,i}))$$
$$= \sum_{l=1}^M \left(\frac{sl}{d_{l,i}}\right)\exp(-jk(d_{l,0} - \Delta x_i \cos\alpha_l - \Delta y_i \sin\alpha_l - r\cos(\alpha_l - \varphi_i)))$$

Note that the relative channel $\hat{h}_i = h_{i,2}h^*_{i,1}$ does not simplify as in the case of a single path because each of the terms is itself a summation. However of the $M^2$ terms in the product of the two summations, M terms are similar to the case with only a direct path plus the remaining "cross" terms as:

$$\hat{h}_i = h_{i,2}h^*_{i,1}$$
$$= \sum_{m=1}^M (s_m/d_{m,i})\exp(-jk\delta d_{m,i})\left((s_m/d_{m,i}) + \sum_{\substack{1 \le l \le M \\ l \ne m}} (s_l/d_{l,i})\tilde{h}_{k,l,i}\right)$$

where $$\tilde{h}_{k,l,i} = \exp(+jk((d_{m,0} - d_{l,0}) - (\Delta d_{m,i} - \Delta d_{l,i}) + \delta_{l,i}))$$

recalling that $$\delta_{m,i} = r\cos(\alpha_m - \varphi_i).$$

Note that the first term (m=1) is assumed to correspond to the direct path with $\alpha_1 = \alpha_T$.

In this multipath scenario, the direction profile is again computed as $$P_i(\alpha) = \hat{h}_j \exp(+jkr\cos(\alpha - \varphi_i)).$$

and averaged over a sequence of transmissions from the same transmitter as $$P(\alpha) = (1/n)|\Sigma_{i=1}^n P_i(\alpha)|^2.$$

In practice, this averaging over N receptions results in the power profile having M peaks and the effect of the "cross" terms is bounded. Without providing a complete proof of this bounding of the cross terms, an intuition of why this is the case can be understood in the special case in which the first antenna remains in a fixed location and the device is rotated such that $\varphi_i$ varies through 180 degrees for a large number of transmissions N. Very generally, in such a scenario, the variation of the path difference $\delta_{l,i}$ results in attenuation of the summation over $l \ne m$ to go to zero with increasing N. A more complete proof of this property is found as Lemma 4.2 in Provisional Application 61/981,264, and as published in Kumar et al., "Accurate indoor localization with zero start-up cost." In *Proceedings of the 20th annual international conference on Mobile computing and networking (MobiCom '14)*. ACM, New York, N.Y., USA, pp. 483-494, which is also incorporated herein by reference.

As introduced above, although the computation of the direction profile makes use of orientation estimates $\varphi_i$, the measurements $\hat{\varphi}_i$ from the sensors (e.g. derived from accelerometers and/or gyroscopes) may exhibit drift, for instance as $\varphi_i \approx \hat{\varphi}_i + At$. If the rate of drift A is ignored, then the direction profiles will not in general constructively add over the multiple transmission as desired. For example, the magnitude of A may correspond to a drift rate of several degrees per second. Note that a drift of θ degrees in the orientation results in a shift by θ degrees in the direction profile P(α).

One approach to estimating the drift in the orientation measurements is to track a correlation between successive direction profiles, and maintaining an estimate of the drift rate A. This drift rate is then used to correct the raw orientation sensor values before combining them to form the direction profile for each of the transmitters.

In operation, the user of the device moves and/or rotates the device in the environment. For example, the user is instructed to twist the device about a vertical axis. The device computes direction profiles to multiple different transmitters. In some implementations, the device solicits transmissions from the transmitters. For example, with WiFi access points as transmitters, the device broadcasts beacon frames to multiple access points. Based on the received transmissions, the device computes direction profiles as described above, with one profile per transmitter.

In the absence of multipath, each direction profile is expected to have a single dominant peak. The device then uses a triangulation approach to determine a location in the environment that is consistent with the angular locations of the peaks. For example, in two dimensions, assuming that the device does not have an estimate of an absolute orientation in the environment, knowledge of the relative angle between the paths to two transmitters constrains the location of the device to a curved path. Relative angles to three or more transmitters constrain the location of the device to a point. More precisely, the angles to three or more transmitters at known locations constrain the location of one antenna to a point in two dimensions, and the estimated angle φ then constrains the location of the second antenna.

Note that the approaches described above in two dimensions may be applied to three dimensions. Such a generalization is particularly important, since it is difficult to restrict users to perfectly rotate their devices in a two dimensional plane. In general, in three dimensions, terms involving a direction α in two dimensions are replaced with terms involving azimuthal angle α and polar angle β. For example, the term $\delta d_i = r \cos(\alpha_k - \varphi_i)$ is replaced by $\delta d_i = r \cos(\alpha_k - \varphi_i) \sin(\beta_k - \theta_i)$, where $(\varphi_i, \theta_i)$ characterizes the orientation of the device. The direction profile is then computed as $$P_i(\alpha, \beta) = \hat{h}_i \exp(+jkr \cos(\alpha - \varphi_i) \sin(\beta - \theta_i)).$$

In three dimensions, relative angles to three or more transmitters provides sufficient information to the device to locate the device in three dimensions relative to the known three-dimensional locations of the transmitters. Furthermore, the estimate orientation of the device provides an absolute direction between the antennas. Of course, with only two antennas, a direction of rotation of the device on an axis joining the antennas cannot in general be resolved in this way. With three or more antennas and three or more transmitters, the orientation $(\varphi_i, \theta_i)$ can in general be determined unambiguously from the transmissions.

In practice, accumulated direction profiles may contain multiple peaks owing to multipath. As a result, there may be an inherent ambiguity in the direction of these access points relative to the device. An approach to such ambiguity is addressed in some embodiments using the following two key observations.

The multipath peaks in a direction profile can be differentiated from the direct path peak using the following observation: In general, the direct peak in a profile persists even as the device's position is slightly perturbed, whereas multipath peaks change significantly or disappear altogether. In fact, as in embodiments that require a user to twist the device to perform localization, such perturbations are inherent. Therefore, by performing localization on two different segments of the device's trajectory (essentially emulating two antenna arrays at slightly different locations), the device compares the resulting multipath profiles to eliminate peaks that do not persist between these profiles.

Second, often devices are surrounded by more than three transmitters. This leads to an over-constrained optimization problem for triangulation, which can be formulated as a least-square fitting problem. Notice that the peaks corresponding to the direct path to each of many different access points agree on a unique location for the device, and therefore lead to a good fit. In contrast, multipath peaks of the access points indicate conflicting locations for the device leading to poor fits. Therefore, by selecting the set of peaks to access points that achieve the best fit in the optimization problem (i.e. agree the most geometrically), the device identifies the set of direct paths to these access points.

As introduced above, the device is able to determine its global position in the environment as well as its global orientation, relative to the access points' frame of reference. Notice that global orientation is not available from the device's gyroscope, which only measures angular velocity, and therefore can only be used to find relative orientation between two time intervals. The key reason the approach provides device orientation is that it computes the angle-of-arrival of signals from the transmitters. In particular, the device determines the angle of the transmitter, relative to the axis of its own body. But after performing localization, the device also knows the direction of this access point relative to the global axes. Hence, by simply subtracting the two angles, the device can compute its orientation relative to the world's axes.

Embodiments of the localization approaches described above can be used in a variety of applications using a variety of devices. As one class of applications, the localization enables precision geotagging of indoor objects with no RF source attached to them. For example, this enables users to catalog and share the location of objects of interest they observe around them, i.e., products in a warehouse or artifacts in a museum. To enable this application, we leverage the fact that in addition to Wi-Fi chips and gyroscopes, most wireless devices today also have cameras on them. Today, vision toolkits can be applied to overlapping photos taken from these cameras to produce 3D pointclouds, or relative 3D positions, for imaged objects.

Figure 5:
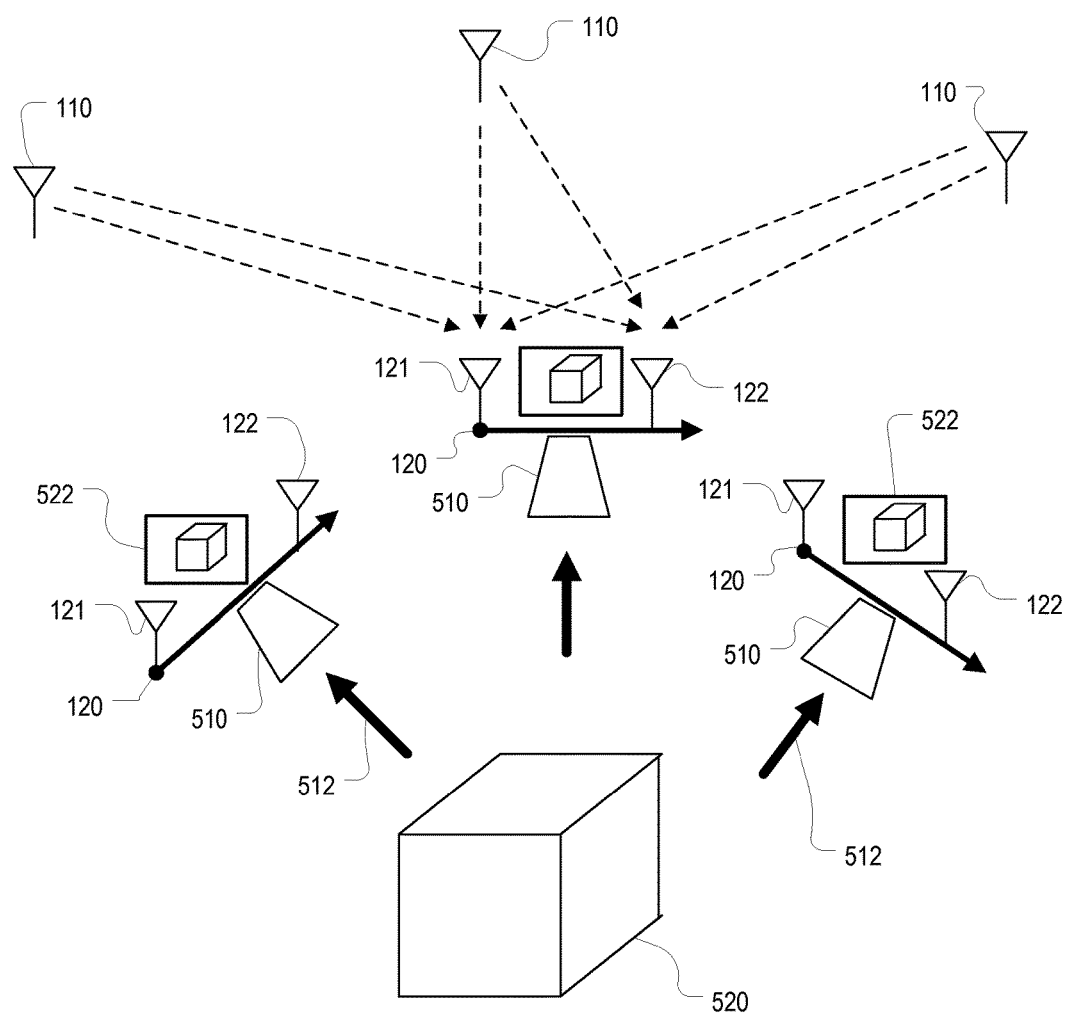
FIG. 5 is a schematic diagram of a geotagging approach.

Referring to FIG. 5, in a geotagging application, the device 120 includes a camera 510. At each of multiple locations (three locations are illustrated in FIG. 5), the device uses the camera 510 to acquire an image 522 of a physical scene 520 (schematically illustrated as a cube in the figure) in the environment (i.e., of light 512 reflecting from the scene to the camera 510). A vision toolkit is used to process the images 522 taken of a single scene from different vantage points in order to reconstruct the 3D positions of objects in the image as a point cloud. As a biproduct of the processing by the vision toolkit, the locations and orientations of the device are inferred from the images 522 in the frame of reference of the point cloud of the scene. These locations are referred to as $\{x_{p_1}, x_{p_N}\}$ (i.e., vector quantities characterizing six degrees of freedom of position and orientation in the three-dimensional space).

While these tools are impressively accurate at inferring relative distances and orientations in the local coordinate frame of the camera, they cannot provide information on the positions of the camera or photographed objects in the global frame that a user cares about. For example, a vision-based reconstruction can accurately determine that the biology magazine stack is one foot away from the physics magazine stack, but cannot determine that these magazine stacks are located in shelf-5 of the mezzanine level room in the NY public library. In contrast, a core ability of the localization approach presented herein is that it can determine the global position of the device's camera at a given point in time. Hence we can synergize the fine-grained relative distances of object-to-camera computed by the vision toolkit, with the accurate global camera-position provided by the localization approach. This allows for a joint optimization problem that provides the global position of the objects of interest.

In some examples, vision algorithms for 3-D imaging read a set of 2-D images of the object snapped by the device's camera from multiple perspectives to obtain two outputs:

3-D reconstruction of the object: obtained in the frame of reference of the device camera. This reconstruction is a 3-D point cloud containing the (x, y, z) coordinates of points on the object's surface in a 3-D frame of reference whose origin is at the camera's initial position and axes along its initial orientation; and Relative Camera Positions and Orientation: of the vantage points where the 2-D images were taken, defined relative to the camera's initial position and orientation.

At a high level, in some implementations, vision algorithms obtain these quantities in three phases: First, they identify salient features (e.g. corners or distinctive textures) in each of the images. Next, these features are used to identify positions of the same object between these images. Finally, they apply algorithms that use the distance of the same features to the different camera positions from where the images were taken, to infer relative object positions and camera positions.

Once a 3D pointcloud of the imaged objects is constructed via the vision algorithm, a suitable transformation is found in order to map the object locations into the (global) reference frame of the environment. To do this, the localization in N different positions and orientations where the snapshots were taken (assuming N is at least three) are determined using the direction profile localization approach described above. The N camera positions can now serve as anchor points, points for which we have both global positions $\{x_{g_1}, x_{g_N}\}$ computed using the radio signal based localization, and relative positions, $\{x_{p_1}, x_{p_N}\}$ in the coordinate frame of the reconstructed point cloud computed using the acquired images. A relationship (or transformation) between the two coordinate systems is found via the following optimization problem that can readily be solved for the unknown transformation (rotation R and translation t) that minimizes the following error in fit:

$$\min_{R,t} \sum_{i=1}^{N} \|x_{g_i} - (Rx_{p_i} + t)\|^2$$

In general the more anchor points that are available, the more accurately the device can find the transformation. The rotation R and translation t are now the key relationship between the point cloud and global coordinate frames and in particular, it can be applied to any object in the point cloud in order to find the global position of that object.

As introduced above, in some embodiments, the device leverages the relative camera locations output by vision algorithms to greatly refine its own device localization. Specifically, visual algorithms excel at finding relative camera locations, particularly when they observe a rich set features at pixel resolution. Therefore, by applying the transformation to the camera positions returned by the vision algorithm, the device now has two sets of position estimates for the camera, both in the global reference frame. In this way, the device can accurately compensate for relative errors in the device's indoor positioning.

The discussion above focusses on a case where each transmission is at a single frequency. In some situations, each transmission may have multiple frequency components. For instance, this is the case with Othogonal Frequency Division Multiplexing (OFDM) signals. One approach to using multiple frequency components is to determine a direction profile separately for each frequency component, and then combine these direction profiles for example, by treating them as separate measurements that are made concurrently at a single location. For instance, separate channel estimates are determined at the receiver for each frequency component, and the approaches described above are repeated with the channel estimates for each frequency component.

In the description above, the localization of the device is performed at the device. However, it should be understood that some or all of the computation can be performed elsewhere, for example, by passing the channel estimates from the transmitters to a central computation location (e.g., to a server computer, or a processor of one of the access points). Furthermore, although the approach as described makes use of known locations of the transmitters, for example, as distributed to a database at the device or as accessible from the device, it should be understood that these locations may be inferred during use in a mapping approach (e.g., in a "simultaneous localization and mapping (SLAM) approach").

It should also be understood that other approaches to inferring the orientation and changes in orientation of the device may be used. For example, sensor that provides gravity direction, a magnetic compass, etc. may be used. Furthermore, orientation sensors may be dispensed with entirely in some implementations, for example, making use of assumed characteristics of rates of translation and rotation of the device to align successive direction profiles.

Although described for indoor localization, the approaches described above may also be used in outdoor situations, for example, using cellular radio transmissions from multiple base stations.

Implementations of the approaches described above may be implemented in a combination of software (i.e., using software controlled processors), hardware, or using a combination of software and hardware. Software based implementation may use instructions stored on non-transitory machine readable media (e.g., semiconductor memory), the execution of which cause circuitry including a processor to perform the functions described. It should be understood that modules that are implemented in software may be connected or communicate with one another via software-implement constructs (e.g., data buffers) while being implemented using a same processor. Hardware implementations may use application specific integrated circuits (ASICs), field programmable gate arrays (FPGAs) and the like. Configurable circuitry (e.g., FPGAs) may be configured by data (e.g., "personality data") stored on a machine-readable medium.

It is to be understood that the foregoing description is intended to illustrate and not to limit the scope of the invention, which is defined by the scope of the appended claims. Other embodiments are within the scope of the following claims.

What is claimed is:

1. A method for localization of a device comprising:
receiving a plurality of transmissions, each transmission being emitted from a corresponding transmitter of a plurality of transmitters at fixed locations in an environment, the receiving including receiving each of the plurality of transmissions at a plurality of antennas at fixed locations on the device, each transmission being received at a different time of a plurality of transmission times, the device being at a different pose of a plurality of poses at at least some of the times of the plurality of transmission times;
for each transmission of the plurality of transmissions,
characterizing one or more relative channel characteristics between the corresponding transmitter and the plurality of antennas,
processing the relative channel characteristics to form a direction profile,
measuring an orientation of the device at the time of receiving the transmission;
for each transmitter of the plurality of transmitters,
combining the direction profiles and measured orientations for transmission of the plurality of transmissions corresponding to the transmitter to form a combined direction profile; and
determining pose-related data for the device from the combined direction profiles for multiple of the transmitters and from locations of the transmitters, the pose-related data including at least a location of the device.

2. The method of claim 1 wherein characterizing the one or more relative channels includes, for one or more pairs of antennas, determining a channel characteristic for the transmission from the corresponding transmitter to each antenna of the pair of antennas, and combining the channel characteristics for the pair of antennas.

3. The method of claim 2 wherein each channel characteristic characterizes at least a phase of the channel.

4. The method of claim 3 wherein each channel characteristic further characterizes at least a gain of the channel.

5. The method of claim 2 wherein characterizing a relative channel includes, for one or more pairs of antennas, computing a product of a first complex channel characterization to a first antenna of the pair of antennas and a complex conjugate of a second complex channel characterization to a second antenna of the pair or antennas.

6. The method of claim 1 wherein processing the relative channel characteristics to form the direction profile comprises computing a function of a direction of arrival from the one or more relative channel characteristics.

7. The method of claim 1 wherein measuring the orientation of the device includes acquiring an inertial measurement characterizing at least one of an orientation and a change in orientation of the device.

8. The method of claim 7 wherein the inertial measurement comprises a gyroscope measurement.

9. The method of claim 7 wherein combining the direction profiles and the measured orientations comprises estimating a drift in the measured orientations, and mitigating an effect of said drift in the determining the pose-related data.

10. The method of claim 1 wherein determining the pose-related data for the device comprises estimating one or more angles of arrival for each transmitter, and triangulating the device using said estimated angles.

11. The method of claim 10 wherein at least some of the transmissions follow multiple paths to the antennas of the device and at least one transmitter has multiple estimated angles of arrival, and the combined direction profiles comprises selecting one of the estimated angles of arrival as the direct angle of arrival for said transmitter.

12. The method of claim 1 further comprising instructing a user of the device to move the device in the environment, and receiving the plurality of transmissions during resulting motion of the device.

13. The method of claim 12 wherein instructing the user to move the device comprises instructing the user to rotate the device.

14. The method of claim 1 further comprising:
acquiring optical images of one or more objects in the environment at a plurality of image acquisition times;
combining the optical images including determining poses-related data for the device relative to the one or more objects at the image acquisition times;
combining the pose-related data determined from the direction profiles and the pose-related data determined from the optical images.

15. The method of claim 14 wherein combining the optical images further includes determining a three-dimensional representation of the one or more objects, and wherein combining the pose-related data includes determining a location of the three-dimensional representation relative to locations of the plurality of transmitters.

16. Software stored on a non-transitory machine-readable medium comprising instructions for causing a processor to:
receive data representing a plurality of transmissions, each transmission being emitted from a corresponding transmitter of a plurality of transmitters at fixed locations in an environment, the receiving including receiving each of the plurality of transmissions at a plurality of antennas at fixed locations on a device, each transmission being received at a different time of a plurality of transmission times, the device being at a different pose of a plurality of poses at at least some of the times of the plurality of transmission times;
for each transmission of the plurality of transmissions,
characterize one or more relative channel characteristics between the corresponding transmitter and the plurality of antennas,
process the relative channel characteristics to form a direction profile,
measure an orientation of the device at the time of receiving the transmission;
for each transmitter of the plurality of transmitters,
combine the direction profiles and measured orientations for transmission of the plurality of transmissions corresponding to the transmitter to form a combined direction profile; and
determine pose-related data for the device from the combined direction profiles for multiple of the transmitters and from locations of the transmitters, the pose-related data including at least a location of the device.

17. A localization system comprising:
a device including
a plurality of antennas for receiving a plurality of transmissions from corresponding transmitters at fixed locations in an environment, each transmission being received at a different time of a plurality of transmission times, the device being at a different pose of a plurality of poses at at least some of the times of the plurality of transmission times, a receiver coupled to the antennas, the receiver configured to provide channel characterizations for channels from the transmitters via the antennas, and an orientation sensor for providing orientation-related measurements;

wherein the system further comprises:

storage for data characterizing locations of the transmitters; and a localizer configured to receive information from the receiver, the storage, and the orientation sensor, and configured to compute pose-related data for the device by for each transmission of the plurality of transmissions, characterizing one or more relative channel characteristics between the corresponding transmitter and the plurality of antennas, processing the relative channel characteristics to form a direction profile, and measuring an orientation of the device at the time of receiving the transmission, for each transmitter of the plurality of transmitters, combining the direction profiles and measured orientations for transmission of the plurality of transmissions corresponding to the transmitter to form a combined direction profile, and determining pose-related data for the device from the combined direction profiles for multiple of the transmitters and from locations of the transmitters, the pose-related data including at least a location of the device.

18. The localization system of claim 17 wherein the localizer is hosted on the device.

19. The localization system of claim 17 wherein the device further includes a camera and a storage for images acquired by the camera, and wherein the system further comprises an image processor configure to combining the images including determining poses-related data for the device relative to one or more objects in said images, and wherein the localizer is further configured to combine the pose-related data determined from the transmissions and the pose-related data determined by the image processor.

20. The localization system of claim 17 further comprising the transmitters at the fixed locations in the environment.

* * * * *